United States Patent [19]

Berard et al.

[11] Patent Number: 5,394,345
[45] Date of Patent: Feb. 28, 1995

[54] METHOD AND APPARATUS FOR CORRECTING A PRESSURE MEASUREMENT FOR THE INFLUENCE OF TEMPERATURE

[75] Inventors: Michel V. Berard, Palaiseau; Pierre Eisenmann, Paris, both of France; Yoshinobu Jinzaki, Tokyo, Japan; Isabelle M. Dubourg, Malakoff, France

[73] Assignee: Schlumberger Technology Corporation, Houston, Tex.

[21] Appl. No.: 259,282

[22] Filed: Jun. 13, 1994

Related U.S. Application Data

[63] Continuation of Ser. No. 918,187, Jul. 23, 1992, abandoned.

[30] Foreign Application Priority Data

Jul. 26, 1991 [FR] France ................................ 91 09481

[51] Int. Cl.⁶ .......................................... G01L 27/00
[52] U.S. Cl. ........................... 364/571.03; 73/4 R; 73/702; 73/708; 364/558; 364/571.01; 374/143
[58] Field of Search .................... 73/4 R, 702, 708; 364/557, 558, 571.01, 571.03; 374/143

[56] References Cited

U.S. PATENT DOCUMENTS

| | | | |
|---|---|---|---|
| 3,354,716 | 11/1967 | Wiebe et al. | 374/143 X |
| 3,355,949 | 12/1967 | Elwood et al. | 374/143 X |
| 3,561,832 | 2/1971 | Karrer et al. | 310/9.6 |
| 4,468,968 | 9/1984 | Kee | 73/708 |
| 4,547,691 | 10/1985 | Valdois et al. | 310/361 |
| 4,592,002 | 5/1986 | Bozarth, Jr. et al. | 364/571.03 |
| 4,607,530 | 8/1986 | Chow | 73/708 |
| 4,644,482 | 2/1987 | Juanarena | 364/571.03 X |
| 4,980,675 | 12/1990 | Meisenheimer, Jr. | 73/708 X |
| 5,231,880 | 8/1993 | Ward et al. | 374/143 X |
| 5,307,681 | 5/1994 | Phelps et al. | 73/708 |
| 5,307,682 | 5/1994 | Phelps et al. | 73/708 |
| 5,307,683 | 5/1994 | Phelps et al. | 73/708 |
| 5,319,965 | 6/1994 | Lynch et al. | 73/151 |
| 5,329,818 | 7/1994 | Frick et al. | 73/708 |
| 5,343,755 | 9/1994 | Huss | 73/708 |
| 5,353,643 | 10/1994 | Glaser | 73/708 |
| 5,361,218 | 11/1994 | Tripp et al. | 364/571.01 |

FOREIGN PATENT DOCUMENTS

| | | |
|---|---|---|
| 2615618 | 1/1988 | France . |
| 2125212 | 2/1984 | United Kingdom . |
| 2205953 | 12/1988 | United Kingdom . |

*Primary Examiner*—Edward R. Cosimano
*Attorney, Agent, or Firm*—Henry N. Garrana; John H. Bouchard

[57] ABSTRACT

The invention relates to a method of correcting the measurements of a pressure gauge for the influence of temperature transients. In a preferred embodiment, a correction term is added to the pressure value measured at an instant t, the correction term $A_0[T(t+\tau)-T(t)]$ being proportional to the difference between the temperature $T(t+\tau)$ measured after a time interval of duration $\tau$ has elapsed from instant t, and the temperature $T(t)$ at instant t. The invention is applicable to measurements in oil wells.

45 Claims, 2 Drawing Sheets

METHOD AND APPARATUS FOR CORRECTING A PRESSURE MEASUREMENT FOR THE INFLUENCE OF TEMPERATURE

This is a continuation of application Ser. No. 07/918,187, filed Jul. 23, 1992, now abandoned.

BACKGROUND OF THE INVENTION

The invention relates in general to a method of correcting the measurements of a pressure gauge for the influence of temperature. More particularly, the invention relates to a dynamic correction method making it possible to correct for the effects of rapid variations of temperature (called transients) the measurements provided by a pressure gauge. The invention is particularly applicable to pressure measurements performed by means of a piezoelectric sensor, and it is particularly advantageous for use with measurements performed in boreholes in the oil industry.

It is known that pressure gauges provide measurements that are highly affected by temperature. This is true of pressure gauges that include a resonator made of a piezoelectric crystal, with a measurement being made on the basis of the resonant frequency of the resonator changing as a result of the pressure applied thereto. This is also true of strain gauges such as piezoresistive bridge gauges, including resistors connected in a bridge circuit with the resistances thereof being changed by deformation due to the application of pressure.

U.S. Pat. No. 4,607,530 (Chow) provides a detailed explanation of techniques for eliminating the effect of temperature on pressure measurements, and is devoted more particularly to gauges including a piezoelectric crystal. A conventional technique as described in U.S. Pat. No. 3,561,832 consists in providing a second gauge for use as a reference, with the second gauge being subjected to the same temperature fluctuations as the measurement gauge, but having a constant pressure applied thereto. Once thermal equilibrium is achieved, the difference between the frequencies of oscillation of the two gauges is assumed to give an indication of the difference between the pressures applied to each of the gauges, without Interference from temperature.

For it to be complete, this "static" compensation technique assumes that the gauges are in thermal equilibrium, in other words that all points on the gauges are at the same temperature. Unfortunately, real measurement conditions are often far from equilibrium, in particular when performing measurements in an oil well. Rapid variations of temperature and fluid pressure in the well are very common, for various reasons. For example, if measurement is performed by means of a device being moved along the well to obtain a log (pressure profile as a function of depth), the temperature around the device changes constantly throughout such displacement because of the geothermal gradient, and at common displacement speeds, time is not available for equilibrium to be reached. Alternatively, if the device is placed at a given depth in the well, and is used in tests during which rapid variations are generated in the pressure acting on the gauge, then pressure shocks give rise to adiabatic heating. Under such conditions, the temperature is not uniform at all points on the gauges, thereby causing the above-mentioned compensation to be inaccurate.

To obtain compensation for pressure measurements in the absence of gauge thermal equilibrium, the above-mentioned Chow patent proposes determining the compensation for a piezoelectric crystal gauge on the basis of a dynamic temperature model established on the basis of the pressure measurement and on the basis of a temperature measurement performed in the proximity of the resonator.

A breakthrough was obtained in the field of piezoelectric crystal pressure gauges by the device described in U.S. Pat. No. 4,547,691. That device is remarkable in that the piezoelectric component vibrates simultaneously in two vibration modes that have completely different sensitivity characteristics: one of the modes (mode C) is highly sensitive to pressure, while the other mode (mode B) is most insensitive to pressure, such that the vibration frequency of the second mode is essentially a function of temperature. From the point of view of compensating pressure measurements, the temperature measurements obtained in this way have the advantage of relating to the same piezoelectric component, rather than on its environment as in previously available devices.

It is mentioned in that patent that the vibration frequency in mode C varies with temperature in accordance with the following equation:

$$\Delta f/fo = a(T-To) + b(T-To)^2 + c(T-To)^3 + k(dT/dt)$$

where To is a reference temperature, dT/dt is the time derivative of temperature, and a, b, c, and k are coefficients. The terms in T−To constitute static correction, whereas the term k(dT/dt) corresponds to the dynamic effect (a transient) that appears during rapid variation of the temperature T of the piezoelectric component.

It has nevertheless been observed, in the situations mentioned above, that the dynamic correction as defined in this way is not entirely satisfactory, since the pressure values obtained clearly continue to have errors that can be attributed to temperature transients.

SUMMARY OF THE INVENTION

The invention seeks to obtain dynamic correction of pressure measurements that is more complete.

In a first implementation of the invention, a correction is added to the value of pressure as measured at an instant t, the correction comprising the sum of a first term proportional to the first derivative dT/dt of temperature relative to time, and a second term proportional to the second derivative $d^2T/dt^2$ of temperature relative to time.

In another implementation, a correction proportional to the change in temperature T during a time interval of duration τ starting at an instant t is added to the pressure value measured at the instant t.

The invention will be well understood on reading the following description made with reference to the accompanying drawings.

DETAILED DESCRIPTION OF THE INVENTION

Figure 1:
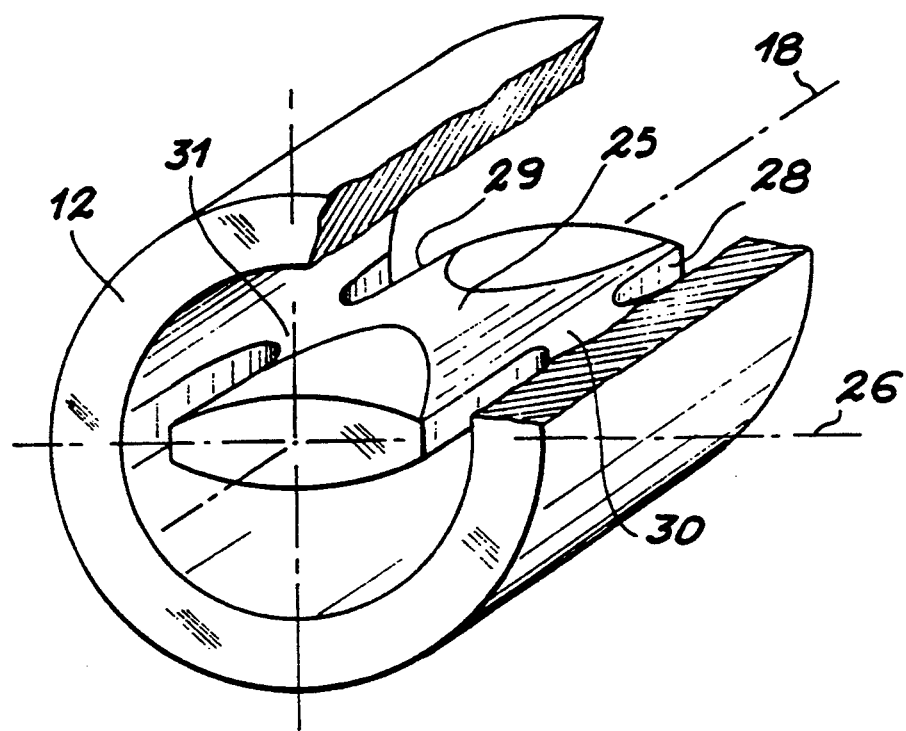
FIG. 1 is a diagram of a pressure sensor in accordance with the teaching of U.S. Pat. No. 4,547,691.

FIG. 1 shows a piezoelectric sensor of the type described in U.S. Pat. No. 4,547,691. For more information concerning this sensor, reference may be made to that document. It is merely recalled that the sensor comprises a tubular component 12 about an axis 18. A resonator constituting plate 25 extends inside the tubular component 12, with the plate being rectangular in shape in plan view having long sides parallel to the axis 18 of the tubular component. The plate is symmetrical in its thickness direction about a plane referenced 26 and constituting a diametral plane of the tubular component 12. The plate is delimited laterally by two faces 28 and 29 which are connected via respective linking bridges 30 and 31 to the inside surface of the tubular component 12. The tubular component 12, the plate 25, and the linking bridges 30 and 31 are all made from a single block of piezoelectric crystal.

The plate has several modes of vibration present simultaneously, and they differ in frequency. So-called "thickness shear" vibration modes B and C are used.

As taught in the above-mentioned patent, the way the plate is cut and the direction in which forces are applied to the plate via the linking bridges are defined in such a manner that the sensitivity of its vibration frequency to forces is high in one of its vibration modes and practically zero in the other mode. Its frequency in the first mode (mode C) is thus representative of the pressure exerted on the outside surface of the tubular component 12, whereas its frequency in the other mode (mode B) is substantially insensitive to pressure. In both modes, its frequency is highly dependent on temperature. Its mode B frequency which is substantially insensitive to pressure is representative of the temperature T of the plate 25. Knowing the temperature T makes it possible to determine a temperature correction C(T) which is applied to the raw pressure measurements $P_{mes}$, obtained from the mode C frequency to obtain corrected pressure values $P_{corr}$:

$$P_{corr} = P_{mes} + C(T)$$

As described above, the correction term C(T) is in fact the combination of a static term $C_s(T)$ added to a dynamic term $C_d(T)$.

The static term $C_s(T)$ describes the effect of temperature once thermal equilibrium has been achieved in the sensor. It is a function solely of the difference between the temperature T of the sensor and a reference temperature $T_o$, which may be fixed at 25° C., for example. As mentioned above, the above-mentioned patent shows that this static term is given by a third degree polynomial:

$$C_s(T) = a(T-T_o) + b(T-T_o)^2 + c(T-T_o)^3$$

The pressure values obtained by applying the static correction only are noted $P_{sta}$ below:

$$P_{sta} = P_{mes} + C_s(T)$$

The dynamic term $C_d(T)$ corresponds to the influence of high speed temperature variations (transients) due to variations in the temperature and/or the pressure of the surrounding fluid. These transients give rise to temperature variations within the resonator component that are nor uniform.

Figure 2:
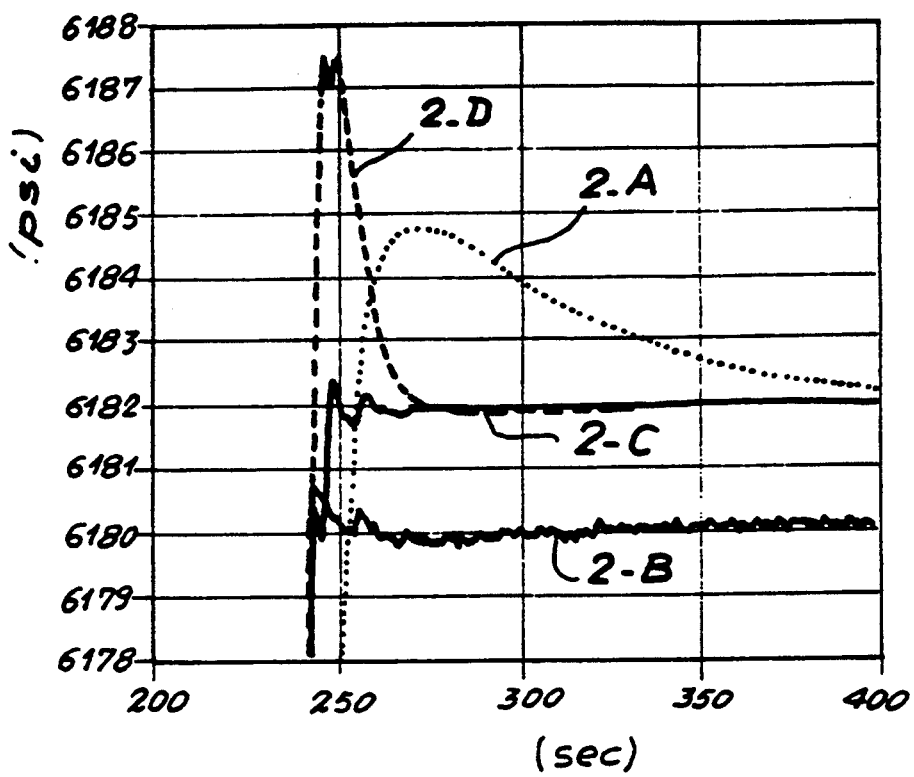
FIG. 2 shows an example of dynamic correction performed in accordance with a first implementation of the invention and applied to measurements obtained using the sensor of FIG. 1.

Curve 2-A in FIG. 2 shows the influence of such temperature transients on pressure measurements in the event of the pressure applied to the sensor increasing suddenly. The resulting adiabatic heating gives rise to a temperature transient which temporarily exaggerates the increase in pressure (which effect is called "overshoot"). In FIG. 2, it is specified that the pressure units used are pounds per square inch as is common practice in the oil industry, and that the pressures given are the above-mentioned values $P_{sta}$, i.e. corrected for the static effect. By way of comparison, curve 2-B shows the pressure values obtained by means of a commercially available strain gauge which is less accurate and noisier than a piezoelectric sensor, but which has a shorter response time.

Experience also shows that in the event of a sudden drop in pressure, an effect of the same type occurs, but in the opposite direction, i.e. there is a temporary exaggeration of the pressure drop (which effect is called "undershoot").

In one embodiment, the dynamic term comprises adding together a term proportional to the first derivative of temperature relative to time plus a term proportional to the second derivative of temperature relative to time, satisfying the equation:

$$C_d(T) = A_1(T)\frac{dT}{dt} + A_2(T)\frac{d^2T}{dt^2} \tag{1}$$

where $A_1(T)$ and $A_2(T)$ are coefficients depending on temperature.

For each of these coefficients, it has been found that their dependence on temperature can be expressed adequately by a second degree polynomial. For each type or implementation of the pressure gauge, the coefficients of the polynomial need to be determined. For the piezoelectric sensor described in above-mentioned U.S. Pat. No. 4,547,691, the following expressions have been found:

$$A_1(T) = 234\,[1 + 0.166(T/100) + 0.195(T/100)^2] \tag{2-1}$$

$$A_2(T) = 737\,[1 - 0.155(T/100) + 0.476(T/100)^2] \tag{2-2}$$

FIG. 2 shows the effectiveness of the above-described dynamic correction. Solid line curve 2-C is obtained by applying this correction to the values of dotted line curve 2-A. It can be seen that this curve reaches a stable pressure value in a few seconds, and that it describes the pressure variation in a manner that is entirely similar to curves 2-B (apart from an offset of 2 psi, probably due to a question of calibration).

FIG. 2 also includes a curve 2-D which illustrates the result of applying the method described in above-specified U.S. Pat. No. 4,547,691 and using only a correction proportional to the first derivative of temperature: that method achieves a stable value, but only after a period of time that is longer than that of the present invention, and it exaggerates the initial overshoot more than curve 2-A.

Implementing the above-described method makes use of conventional techniques for calculating derivatives. At each instant t, a fixed duration time window is used centered on the instant t, and the temperature derivatives are calculated from the set of temperature values obtained in the window. For example, if a measurement is obtained three times per second, a three-second window may be selected, giving nine values in all.

In another implementation, the dynamic correction term to be applied at instant t is defined as being proportional to the difference between the temperature $T(t+\tau)$ measured after a time interval $\tau$ has elapsed starting from the instant t, and the temperature $T(t)$, in accordance with the equation:

$$C_d(T) = A_0(T)[T(t+\tau) - T(t)] \quad (3)$$

where $A_0(T)$ is a coefficient that depends on temperature, and $\tau$ is a time interval that also depends on temperature.

The above equation is mathematically closely related to preceding equation (1). The following may be written:

$$A_0(T)[T(t+\tau) - T(t)] \sim A_0(T)\left[\tau \frac{dT}{dt} + \frac{\tau^2}{2} \frac{d^2T}{dt^2}\right] \quad (4)$$

$A_0(T)$ and $\tau$ can thus be expressed as a function of $A_1$ and $A_2$ by the following equations:

$$\tau = 2[A_2(T)/A_1(T)] \quad (5\text{-}1) \text{ and}$$

$$A_0(T) = 0.5[A_1(T)^2/A_2(T)] \quad (5\text{-}2)$$

Using the numerical expression (2-1) and (2-2) given above for $A_1$ and $A_2$, the following expressions are obtained for $\tau$ and $A_O$:

$$\tau(T) = 5.7511 - 0.055(T/100) + 0.120(T/100)^2] \quad (6\text{-}1)$$

$$A_O(T) = 39.511 + 0.340(T/100) - 0.020(T/100)^2] \quad (6\text{-}2)$$

It should be observed that $\tau$ and $A_O$ depend relatively little on temperature over the temperature ranges that are encountered in oil wells: $\tau$ is practically constant in the range 0° C. to 100° C. (its value being about 6 seconds) and it increases quadratically between 100° C. and 200° C. $A_O$ increases linearly between 0° C. and 200° C. from 40 psi/°C. to 60 psi/°C. In comparison, the coefficients $A_1$ and $A_2$ corresponding to the expressions (2-1) and (2-2) increase respectively by 100% and 150% in the range 0° C. to 200° C.

Figure 3:
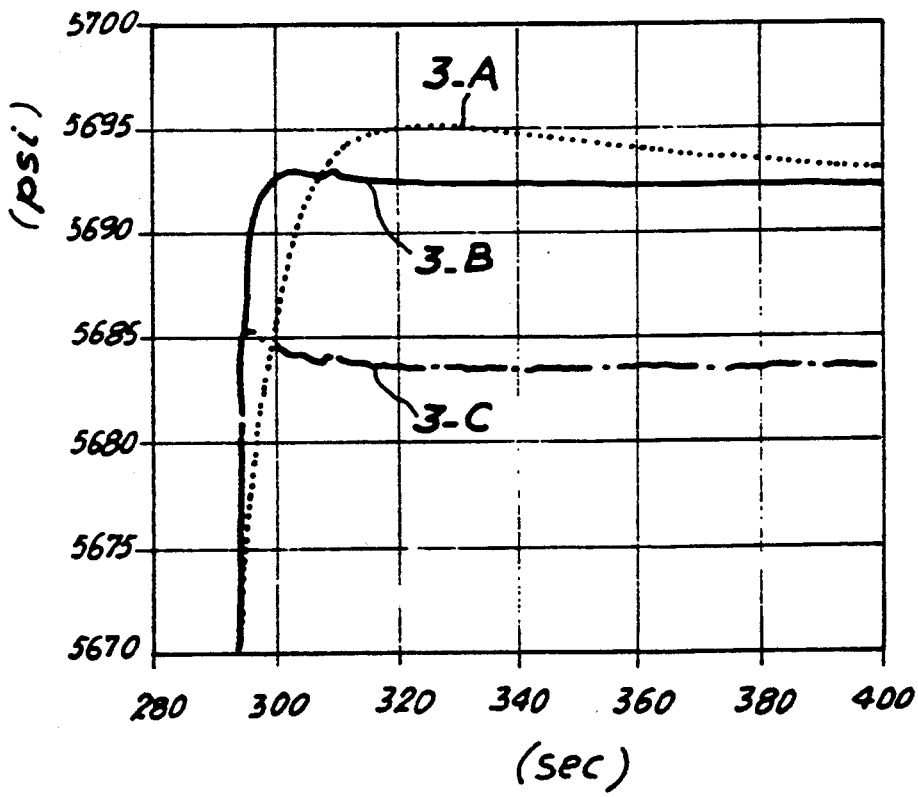
FIG. 3 shows the dynamic correction performed by a second implementation of the invention.

FIG. 3 shows an application of this second implementation in the event of a (positive) pressure shock. Dashed line curve 3-A shows how the pressure $P_{sta}$ changes after the above-specified static correction has been applied. Curve 3-B shows the pressure values $P_{corr}$ obtained after applying the dynamic correction of the second implementation of the invention. By way of comparison, curve 3-C shows the results obtained using a commercially available strain gauge.

Although the two modes of correction described above generally give equivalent results, the second mode making use of the temperature difference $T(t+\tau) - T(t)$ makes it possible to perform calculations that are simpler and quicker than with the first mode (since the first mode uses derivative calculations) and it is less sensitive to the noise that affects the temperature measurements. In addition, if a rapid change occurs in temperature values, the pressure values obtained by means of the correction that makes use of derivatives may have artifacts in the form of parasitic peaks which do not appear in the pressure values corrected by the second implementation.

The invention is described above for a piezoelectric sensor as shown in FIG. 1, which sensor is designed to provide data that is optimum from the temperature correction point of view, since the temperature measurements are obtained using the same resonator as the pressure measurements, thereby guaranteeing that the data obtained is indeed representative of the temperature of the resonator. However, the invention is not limited to that type of sensor and the dynamic correction method of the invention may be used with other types of sensor.

We claim:

1. A system for sensing a first pressure under the influence of a temperature and generating a corrected output signal representative of said first pressure corrected for said influence of said temperature, comprising:

sensing means for sensing said first pressure under said influence of said temperature, said sensing means generating a first output signal representative of said first pressure and a second output signal representative of said temperature; and correction means responsive to said first output signal and said second output signal from said sensing means for determining a temperature correction in response to said temperature of said second output signal and applying said temperature correction to said first pressure of said first output signal, said correction means determining a second pressure representing said first pressure corrected for said influence of said temperature when said temperature correction is applied to said first pressure of said first output signal and generating said corrected output signal representative of said second pressure.

2. The system of claim 1, wherein said correction means determines a static part of said temperature correction in response to said temperature of said second output signal and applies said static part of said temperature correction to said first pressure of said first output signal.

3. The system of claim 2, wherein said static part of said temperature correction comprises a third degree polynomial equation.

4. The system of claim 3, wherein said third degree polynomial equation is expressed by the following expression:

$$C_s(T) = a(T - T_o) + b(T - T_o)^2 + c(T - T_o)^3,$$

where T represents said temperature of said second output signal, $T_o$ represents a reference temperature, and a, b, and c represent coefficients.

5. The system of claim 2, wherein said correction means determines a dynamic part of said temperature correction in response to said temperature of said second output signal and applies static part and said dynamic part of said temperature correction to said first pressure of said first output signal.

6. The system of claim 5, wherein said dynamic part of said temperature correction comprises an overall equation including a first term proportional to a first derivative of said temperature of said second output signal relative to time and a second additional term proportional to a second derivative of said temperature of said second output signal relative to time.

7. The system of claim 6, wherein said static part of said temperature correction comprises a third degree polynomial equation.

8. The system of claim 7, wherein said third degree polynomial equation is expressed by the following expression:

$$C_s(T) = a(T-T_o) + b(T-T_o)^2 + c(T-T_o)^3,$$

where T represents said temperature of said second output signal, $T_o$ represents a reference temperature, and a, b, and c represent coefficients.

9. The system of claim 5, wherein said dynamic part of said temperature correction comprises an overall equation proportional to a difference between a temperature T(t+Tau) and a temperature T(t), where:
said t is a time instant when said sensing means senses said first pressure and generates said second output signal representative of said temperature,
said Tau is an elapsed time interval following the time instant t,
said temperature T(t+Tau) is the temperature of said second output signal generated by said sensing means at a time instant t+Tau, and
said temperature T(t) is the temperature of the second output signal generated by said sensing means at said time instant t.

10. The system of claim 9, wherein said static part of said temperature correction comprises a third degree polynomial equation.

11. The system of claim 10, wherein said third degree polynomial equation is expressed by the following expression:

$$C_s(T) = a(T-T_o) + b(T-T_o)^2 + c(T-T_o)^3,$$

where T represents said temperature of said second output signal, $T_o$ represents a reference temperature, and a, b, and c represent coefficients.

12. The system of claim 1, wherein said sensing means comprises:
an external housing, said first pressure and said temperature being exerted on an external part of said external housing; and
a plate disposed within and connected to said external housing, said plate having said temperature and being adapted to vibrate,
the plate vibrating at a first frequency representative of said first pressure exerted on said external part of said housing and generating said first output signal representative of said first pressure,
the plate vibrating at a second frequency representative of said temperature of said plate and generating said second output signal representative of said temperature.

13. The system of claim 12, wherein said correction means determines a static part of said temperature correction in response to said temperature of said second output signal and applies said static part of said temperature correction to said first pressure of said first output signal,
said correction means determining a static pressure when said static part of said temperature correction is applied to said first pressure of said first output signal.

14. The system of claim 13, wherein said static part of said temperature correction comprises a third degree polynomial equation.

15. The system of claim 14, wherein said third degree polynomial equation is expressed by the following expression:

$$C_s(T) = a(T-T_o) + b(T-T_o)^2 + c(T-T_o)^3,$$

where T represents said temperature of said second output signal, $T_o$ represents a reference temperature, and a, b, and c represent coefficients.

16. The system of claim 13, wherein said correction means determines a dynamic part of said temperature correction in response to said temperature of said second output signal and applies said static part and said dynamic part of said temperature correction to said first pressure of said first output signal.

17. The system of claim 16, wherein said dynamic part of said temperature correction comprises an overall equation including a first term proportional to a first derivative of said temperature of said second output signal relative to time and a second additional term proportional to a second derivative of said temperature of said second output signal relative to time.

18. The system of claim 17, wherein said static part of said temperature correction comprises a third degree polynomial equation.

19. The system of claim 18, wherein said third degree polynomial equation is expressed by the following expression:

$$C_s(T) = a(T-T_o) + b(T-T_o)^2 + c(T-T_o)^3,$$

where T represents said temperature of said second output signal, $T_o$ represents a reference temperature, and a, b, and c represent coefficients.

20. The system of claim 16, wherein said dynamic part of said temperature correction comprises an overall equation proportional to a difference between a temperature T(t+Tau) and a temperature T(t), where:
said t is a time instant when said sensing means senses said first pressure and generates said second output signal representative of said temperature,
said Tau is an elapsed time interval following the time instant t,
said temperature T(t+Tau) is the temperature of the second output signal generated by said sensing means at a time instant t+Tau, and
said temperature T(t) is the temperature of the second output signal generated by said sensing means at said time instant t.

21. The system of claim 20, wherein said static part of said temperature correction comprises a third degree polynomial equation.

22. The system of claim 21, wherein said third degree polynomial equation is expressed by the following expression:
ti $C_s(T) = a(T-T_o) + b(T-T_o)^2 + c(T-T_o)^3,$ where T represents said temperature of said second output signal, $T_o$ represents a reference temperature, and a, b, and c represent coefficients.

23. A method of sensing a first pressure under the influence of a temperature and generating a corrected output signal representative of said first pressure corrected for said influence of said temperature, comprising the steps of:
(a) sensing said first pressure under said influence of said temperature and generating a first output signal representative of said first pressure under said influence of said temperature and generating a second output signal representative of said temperature;

(b) determining a temperature correction in response to said temperature of said second output signal and applying said temperature correction to said first pressure of said first output signal;

(c) determining a second pressure representing said first pressure corrected for said influence of said temperature when said temperature correction is applied to said first pressure of said first output signal; and (d) generating said corrected output signal representing said second pressure in response to the determining step (c).

24. The method of claim 23, wherein the determining step (b) of determining a temperature correction comprises the steps of:

(e) determining a static part of said temperature correction in response to said temperature of said second output signal and applying said static part of said temperature correction to said first pressure of said first output signal.

25. The method of claim 24, wherein said static part of said temperature correction comprises a third degree polynomial equation.

26. The method of claim 25 wherein said third degree polynomial equation is expressed by the following expression:

$$C_s(T) = a(T-T_o) + b(T-T_o)^2 + c(T-T_o)^3,$$

where T represents said temperature of said second output signal, $T_o$ represents a reference temperature, and a, b, and c represent coefficients.

27. The method of claim 24, wherein the determining step (b) of determining a temperature correction further comprises the step of:

(f) determining a dynamic part of said temperature correction in response to said temperature of said second output signal and applying said static part and dynamic part of said temperature correction to said first pressure of said first output signal.

28. The method of claim 27, wherein said dynamic part of said temperature correction comprises an overall equation including a first term proportional to a first derivative of said temperature of said second output signal relative to time and a second additional term proportional to a second derivative of said temperature of said second output signal relative to time.

29. The method of claim 28, wherein said static part of said temperature correction comprises a third degree polynomial equation.

30. The method of claim 29, wherein said third degree polynomial equation is expressed by the following expression:

$$C_s(T) = a(T-T_o) + b(T-T_o)^2 + c(T-T_o)^3,$$

where T represents said temperature of said second output signal, $T_o$ represents a reference temperature, and a, b, and c represent coefficients.

31. The method of claim 27, wherein said dynamic part of said temperature correction comprises an overall equation proportional to a difference between a temperature $T(t+Tau)$ and a temperature $T(t)$, where:

said t is a time instant when said sensing means senses said first pressure and generates said second output signal representative of said temperature, said Tau is an elapsed time interval following the time instant t, said temperature $T(t+Tau)$ is the temperature of the second output signal generated by said sensing means at a time instant $t+Tau$, and said temperature $T(t)$ is the temperature of the second output signal generated by said sensing means at said time instant t.

32. The method of claim 31, wherein said static part of said temperature correction comprises a third degree polynomial equation.

33. The method of claim 32, wherein said third degree polynomial equation is expressed by the following expression:

$$C_s(T) = a(T-T_o) + b(T-T_o)^2 + c(T-T_o)^3,$$

where T represents said temperature of said second output signal, $T_o$ represents a reference temperature, and a, b, and c represent coefficients.

34. The method of claim 23, wherein a sensor includes an external housing and a plate disposed within and connected to the external housing, said temperature and said first pressure under the influence of said temperature being exerted on said external housing of said sensor, said plate vibrating at a first frequency representative of said first pressure under the influence of said temperature exerted on said external housing and generating said first output signal representative of said first pressure, said plate vibrating at a second frequency representative of said temperature exerted on said external housing and generating said second output signal representative of said temperature, the sensing step (a) comprises the steps of:

(e) sensing said first pressure under the influence of said temperature exerted on said external housing of said sensor;

(f) in response to the sensing step (e), vibrating said plate at said first frequency;

(g) in response to the vibrating step (f), generating said first output signal representative of said first pressure under the influence of said temperature exerted on said external housing;

(h) in response to the sensing step (e), vibrating said plate at said second frequency; and (i) in response to the vibrating step (h), generating said second output signal representative of said temperature exerted on said external housing.

35. The method of claim 34, wherein the determining step (b) of determining a temperature correction comprises the steps of:

(j) determining a static part of said temperature correction in response to said temperature of said second output signal and applying said static part of said temperature correction to said first pressure of said first output signal.

36. The method of claim 35, wherein the determining step (b) of determining a temperature correction further comprises the step of:

(k) determining a dynamic part of said temperature correction in response to said temperature of said second output signal and applying said static part and said dynamic part of said temperature correction to said first pressure of said first output signal.

37. The method of claim 36, wherein said static part of said temperature correction comprises a third degree polynomial equation:

$$C_s(T) = a(T-T_o) + b(T-T_o)^2 + c(T-T_o)^3,$$

where T represents said temperature of said second output signal, $T_o$ represents a reference temperature, and a, b, and c represent coefficients.

38. The method of claim 37, wherein said dynamic part of said temperature correction comprises an overall equation including a first term proportional to a first derivative of said temperature of said second output signal relative to time and a second additional term proportional to a second derivative of said temperature of said second output signal relative to time.

39. The method of claim 37, wherein said dynamic part of said temperature correction comprises an overall equation proportional to a difference between a temperature T (t+Tau) and a temperature T(t), where:
said t is a time instant when said sensing means senses said first pressure and generates said second output signal representative of said temperature,
said Tau is an elapsed time interval following the time instant t,
said temperature T(t+Tau) is the temperature of said second output signal generated by said sensing means at a time instant t+Tau, and
said temperature T(t) is the temperature of said second output signal generated by said sensing means at said time instant t.

40. A system for sensing a first pressure under the influence of a temperature and generating a corrected output signal representative of said first pressure corrected for said influence of said temperature, comprising:
sensing means for sensing said first pressure under said influence of said temperature, said sensing means generating a first output signal representative of said first pressure and a second output signal representative of said temperature; and
correction means responsive to said first output signal and said second output signal from said sensing means for determining a dynamic temperature correction in response to said temperature of said second output signal and applying said dynamic temperature correction to said first pressure of said first output signal,
said correction means determining a second pressure representing said first pressure corrected for said influence of said temperature when said dynamic temperature correction is applied to said pressure of said first output signal and generating said corrected output signal representative of said second pressure.

41. The system of claim 40, wherein said dynamic temperature correction comprises an overall equation including a first term proportional to a first derivative of said temperature of said second output signal relative to time and a second additional term proportional to a second derivative of said temperature of said second output signal relative to time.

42. The system of claim 40, wherein said dynamic temperature correction comprises an overall equation proportional to a difference between a temperature T(t+Tau) and a temperature T(t), where:
said t is a time instant when said sensing means senses said first pressure and generates said second output signal representative of said temperature,
said Tau is an elapsed time interval following the time instant t,
said temperature T(t+Tau) is the temperature of said second output signal generated by said sensing means at a time instant t+Tau, and said temperature T(t) is the temperature of the second output signal generated by said sensing means at said time instant t.

43. A method of sensing a first pressure under the influence of a temperature and generating a corrected output signal representative of said first pressure corrected for said influence of said temperature, comprising the steps of:
(a) sensing said first pressure under said influence of said temperature and generating a first output signal representative of said first pressure under said influence of said temperature and generating a second output signal representative of said temperature;
(b) determining a dynamic temperature correction in response to said temperature of said second output signal and applying said dynamic temperature correction to said first pressure of said first output signal;
(c) determining a second pressure representing said first pressure corrected for said influence of said temperature when said dynamic temperature correction is applied to said first pressure of said first output signal; and
(d) generating said corrected output signal representing said second pressure in response to the determining step (c).

44. The method of claim 43, wherein said dynamic temperature correction comprises an overall equation including a first term proportional to a first derivative of said temperature of said second output signal relative to time and a second additional term proportional to a second derivative of said temperature of said second output signal relative to time.

45. The method of claim 43, wherein said dynamic temperature correction comprises an overall equation proportional to a difference between a temperature T(t+Tau) and a temperature T(t), where:
said t is a time instant when said sensing means senses said first pressure and generates said second output signal representative of said temperature,
said Tau is an elapsed time interval following the time instant t,
said temperature T(t+Tau) is the temperature of the second output signal generated by said sensing means at a time instant t+Tau, and
said temperature T(t) is the temperature of the second output signal generated by said sensing means at said time instant t.

* * * * *